(12) United States Patent
Dunning

(10) Patent No.: US 6,299,119 B1
(45) Date of Patent: Oct. 9, 2001

(54) NOTEPAD ATTACHMENT APPARATUS

(76) Inventor: David J. Dunning, P.O. Box 264, Elkins, NH (US) 03233

( * ) Notice: Subject to any disclaimer, the term of this patent is extended or adjusted under 35 U.S.C. 154(b) by 0 days.

(21) Appl. No.: 09/470,308

(22) Filed: Dec. 22, 1999

(51) Int. Cl.⁷ .................................................. A47B 91/00
(52) U.S. Cl. ........................ 248/346.03; 281/44; 281/45; 462/72; 462/71; 224/411
(58) Field of Search .................. 248/346.03, 444.1, 248/230.8, 230.1, 683, 206.5; 224/277, 411; 281/44, 45, 29, 31; 462/72, 71; 402/73, 4

(56) References Cited

U.S. PATENT DOCUMENTS

| | | | | |
|---|---|---|---|---|
| D. 351,405 | * | 10/1994 | Hood et al. | D18/7 |
| D. 351,408 | * | 10/1994 | Hood et al. | D18/7 |
| D. 391,600 | * | 3/1998 | Hood | D18/2 |
| D. 405,820 | * | 2/1999 | Larson | D18/2 |
| 2,888,761 | * | 6/1959 | Miller | 40/308 |
| 3,251,543 | * | 5/1966 | Bush et al. | 235/1 R |
| 3,539,204 | * | 11/1970 | Keller | 281/45 |
| 3,881,267 | | 5/1975 | Hicks | 40/308 |
| 3,964,134 | * | 6/1976 | Newtson | 280/33.992 |
| 3,993,319 | * | 11/1976 | Day | 280/33.992 |
| 4,034,539 | | 7/1977 | Economy | 40/308 |
| 4,156,318 | * | 5/1979 | Economy | 40/308 |
| 4,274,567 | | 6/1981 | Sawyer | 224/411 |
| 4,423,888 | | 1/1984 | Addison | 281/45 |
| 4,443,961 | | 4/1984 | Gilroy | 40/308 |
| 4,496,058 | * | 1/1985 | Harris et al. | 40/308 |
| 4,512,504 | | 4/1985 | Owlett | 224/572 |
| 4,583,753 | | 4/1986 | Economy | 280/33.992 |
| 4,619,386 | * | 10/1986 | Richardson | 224/277 |
| 4,643,280 | | 2/1987 | Hensley | 190/11 |
| 4,685,701 | | 8/1987 | Amundson et al. | 281/42 |
| 4,743,050 | | 5/1988 | Small | 281/45 |
| 4,802,575 | * | 2/1989 | Martin | 206/232 |
| 4,848,117 | | 7/1989 | Welborn | 40/308 |
| 4,858,353 | * | 8/1989 | Krebs et al. | 40/308 |
| 4,901,901 | * | 2/1990 | Reitenour | 224/277 |
| 5,002,215 | | 3/1991 | Gregoire | 224/277 |
| 5,004,252 | | 4/1991 | Kraper | 280/33.992 |
| 5,086,960 | * | 2/1992 | Schwietzer | 224/277 |
| 5,154,330 | * | 10/1992 | Haynes | 224/277 |
| 5,176,392 | * | 1/1993 | Graebe, Jr. | 280/33.992 |
| 5,489,121 | * | 2/1996 | Mohr | 281/43 |
| 5,566,609 | * | 10/1996 | Kirschner | 108/42 |
| 5,615,817 | * | 4/1997 | Shevers, Jr. | 224/267 |
| 5,797,655 | * | 8/1998 | Miles | 297/411.23 |
| 5,924,736 | * | 7/1999 | Russo | 281/38 |

\* cited by examiner

*Primary Examiner*—Anita King
*Assistant Examiner*—Holly N. Sy
(74) *Attorney, Agent, or Firm*—Robert R. Deleault, Esq.; Mesmer & Deleault, P.L.L.C.

(57) ABSTRACT

A shopping organizer having a base, at least one bar support, a saddle for receiving a bar or handle and a support strap for securing the organizer to the bar or handle. The saddle may be configured into the bottom or into the bar support(s). The organizer further includes at least a pad retaining means and a pen/pencil holder.

18 Claims, 10 Drawing Sheets

NOTEPAD ATTACHMENT APPARATUS

BACKGROUND OF THE INVENTION

1. Field of the Invention

The present invention relates generally to an apparatus for holding a notepad and writing instrument that can be attached to various things, such as cart handles and refrigerators. Particularly, this invention relates to an attachable notepad and accessory holder that can be stored on a refrigerator at home and be removably attached to shopping cart handles while shopping.

2. Description of the Related Art

It is very common for people to use a list of some sort while grocery shopping. Some lists are well organized, others are hastily composed on the backs of envelopes or scrap paper. While shopping, many people also carry an assortment of other shopping tools such as a pen, a pocket calculator and coupons. While these shopping tools may be organized at home, using them at the store can become unmanageable, even a nuisance. Currently, shoppers have no flat, stable surface to write on and no way to review coupons easily while they shop. There is also currently no place to put all of these shopping tools where they can be easily seen and used while shopping. This causes problems because while shoppers are trying to juggle their shopping tools, their hands are not free to push their carts, manage children or reach for items on shelves.

Many inventions have been patented claiming to make shopping with carts more convenient. There is no evidence that any of these prior inventions have become commercially successful. Most of the prior inventions were designed to be permanently mounted on shopping carts, which interests neither store managers nor cart manufacturers due to their cost, nuisance and potential liability. Many of the prior inventions are no longer even feasible solutions to this problem as they were designed to fit only certain styles of carts which are now obsolete. Furthermore, several of the existing product designs are much too elaborate to be manufactured economically.

Present shopping tool organizers that can be carried into the store with shoppers include items such as the shopping organizer shown in U.S. Pat. No. 4,496,058 (1985, G. Harris et al.). Harris discloses a shopping organizer that has a base with an open bin attached to a portion of the base. Both the base and the open bin have a clip attached to them for releasably retaining a plurality of sheets of paper. There is another clip located along one side of this organizer for releasably holding a cylindrical writing instrument. Clamps are secured to the under-surface of the base for releasably retaining the organizer on a complimentary-shaped support, such as a shopping cart handle. This organizer provides space for a shopping list, coupons, calculators and pens or pencils, and can also hold an abundance of paper. One drawback to this invention is that its spring clips attach securely only to certain types and sizes of cart handles, while it attaches only loosely to others. Another drawback is that this organizer appears awkward when being carried in and out of stores. Another drawback of this organizer is that a child cannot sit in the seat of the shopping cart while the organizer is attached to the cart handle because the organizer extends into the sitting area. Furthermore, this organizer has no functional use at home and is not easily stored anywhere when not in use.

U.S. Pat. No. 4,858,353 (1989, A. Krebs et al.) discloses a grocery shopper organizer that consists of a generally flat board adapted to support coupons and the like on the top surface of the board as well as other convenience accessories such as a shopping list, calculator, pen, etc. This organizer is mounted on the upper edge of any upright wall of a shopping cart by an open-bottom channel strip located on the bottom surface of the board near its front edge. The board acts as a counterweight which is pivoted downwardly to a convenient angle of use for the shopper. This board can be attached to a variety of locations on the shopping cart, but can be in the way regardless of where it is attached. If attached to the rear of the child seat area, it interferes with the use of the child seat area. If attached to the handle of the shopping cart, it protrudes into the aisle and can get in the shoppers' way. Another disadvantage of this invention is that items are not always securely attached to the top surface of the board and can fall off when being transported in and out of stores. Furthermore, this board is not conveniently stored at home when not in use.

U.S. Pat. No. 5,086,960 (1992, J. Schwietzer) discloses a grocery cart attachment that has a writing surface with a cart engaging clamp on one end and a foldable support pivotably attached to the underside of the other end. This attachment has a strip of magnetic tape on its underside so it can be mounted on a refrigerator at home. It also has a hole at the top of the writing surface, allowing the invention to be stored on a hook or nail. A drawback to this invention is that it too interferes with use of the child seat area of shopping carts. Also, this invention was designed for shopping carts that are now basically obsolete. Furthermore, items such as coupons and calculators cannot be secured to this invention easily.

U.S. Pat. No. 5,154,330 (1992, W. Haynes) discloses a shopping list holder that fastens to a vertical rod at the rear of a child seat on a standard shopping cart. This holder can be positioned at two distinct angles of repose merely by choosing how to fasten the holder to the vertical rod. This holder has a clip for holding a pen or pencil and also has magnets on it so it can be stored on a refrigerator or other metal surface at home. A drawback to this holder is that it too extends into the child seat area of the shopping cart, thereby making it difficult to use the child seat area of the shopping cart.

U.S. Pat. No. 5,566,609 (1995, S. Kirschner) discloses a shopping cart clipboard and coupon holder comprised of a center portion, a left portion and a coupon receiving portion. The center portion has an upper end and a lower end, each having a securement portion for attaching this device to a shopping cart. The left portion is hingedly attached to the left edge of the center portion. The left portion also has an upper securement portion for attaching to a shopping cart. A coupon-receiving portion is hingedly attached to the right edge of the center portion. The major drawback to this invention is that it attaches to the handle of the shopping cart and to the rear side of the child seat, thereby making it impossible to use the child seat area simultaneously with this invention. Additionally, this invention will only fit certain carts, depending on the distance between the handle and the rear side of the child seat. Furthermore, this invention is not easily stored anywhere at home when not in use.

What is needed is a shopping organizer that can be easily, firmly and removably secured to the handle of any modern shopping cart. What is also needed is a shopping organizer that can be mounted on shopping cart handles at any angle that the user desires. What is further needed is a shopping organizer that will not interfere with groceries in carts, children in the child seat area of the cart, nor with other carts in the aisles of the store. What is still further needed is a shopping organizer that will be inconspicuous when being carried to and from stores. What is yet further needed is a shopping organizer that can be magnetically attached to refrigerator doors or other metal surfaces for convenient planning use and storage at home. Finally, what is needed is a shopping organizer that is compact.

SUMMARY OF THE INVENTION

The present invention relates to an organizer which provides a container conducive to storing and organizing shopping tools that can be easily used in the store and also be easily stored at home. The organizer is composed of a base with a top side, a bottom side and four edges. The top side of the base has at least one pad clip attached to one of its edges for holding a pad of paper on the base. There are pad stops on the other three edges of the top side of the base to prevent the pad from slipping off the base. These stops can be small or they can run the entire length of the edge. A pen or pencil holder may be attached to one edge of the top side of the base.

There are also supports attached to the left and right edges of the bottom side of the base. Straps are attached to these left and right supports for removably attaching the shopping organizer to a shopping cart handle. The bottom side of the base has a saddle running the width of the base for receiving a shopping cart handle. The saddle has a high friction material attached to it so it can grip onto the shopping cart handle and prevent slipping of the shopping organizer. Instead of the saddle being incorporated into the base of the organizer, each support may have a saddle attached to its bottom side. These supports may also be hingedly attached to the base so they can be folded into the base for out of the way storage.

There is at least one magnet attached to the bottom side of the base. This allows the present invention to be easily stored at home on a refrigerator or other metal object. Optionally, an engageable cup holder may be attached to the bottom side of the base. The cup holder may also be retractably connected to the bottom side by sliding, rotating or flipping it into its storage position.

The shopping organizer may also have a cover hingedly attached to one edge of its base. The hinges could be of any type such as spring-loaded hinges or living hinges molded as part of the injection molding process. The cover has an inside face, an outside face and four edges. The inside face of the cover may include a pen or pencil holder. The inside face of the cover may also include a calculator and/or a pocket for holding items such as coupons. The cover has a latch mechanism attached to it so the cover may be held shut when closed. In this embodiment of the present invention, the cover may be closed when the shopping organizer is not in use to protect the shopping tools that are being stored within the shopping organizer. Some latch mechanisms include clips, buckles or spring-loaded hinges. The outside face of the cover may be decorative so as to be appealing when stored at home.

It is therefore an object of the present invention to provide an organizer that can be easily, firmly and removably secured to the handle of any modern shopping cart.

It is also an object of the present invention to provide an organizer that can be mounted on shopping cart handles at any angle that the user desires.

It is a further object of the present invention to provide an organizer that will not interfere with groceries in a cart, children in the child seat area of the cart, nor with other carts in the aisles of the store.

It is a further object of the present invention to provide an organizer that will be inconspicuous when being carried to and from stores.

It is another object of the present invention to provide an organizer that is lightweight, durable and easily manufactured at low cost.

It is a further object of the present invention to provide an organizer with a stable writing surface, a hinged cover, several pockets for organizing coupons, a calculator mounted for easy use, and a retractable cup holder for in-store drinks that facilitates hands-free shopping.

It is yet a further object of the present invention to provide an organizer that can be magnetically attached to refrigerator doors or other metal surfaces for convenient planning use and storage at home.

Finally, it is an object of the present invention to provide an organizer that is compact.

These objects are achieved by providing an organizer that can be removably and firmly attached to a shopping cart handle at any angle the user desires, that will be compact so as to not interfere with children or groceries in the child seat area of the cart, that will be inconspicuous when being carried in and out of stores, that is made of a lightweight, durable material, that is easy and economical to manufacture, and that can be stored on a magnetic surface at home.

Further objects and advantages of the present invention will be more clearly apparent during the course of the following description, references being made to the accompanying drawings which illustrate a preferred form of the present invention and wherein like characters of reference designate like parts throughout the drawings.

DETAILED DESCRIPTION OF THE PREFERRED EMBODIMENT

For the purposes of promoting an understanding of the principles of the invention, references will now be made to the preferred embodiment of the present invention as illustrated in FIGS. 1–10, and specific language used to describe the same. It will nevertheless be understood that no limitation of the scope of the invention is thereby intended. The terminology used herein is for the purpose of description and not limitation. Any modifications or variations in the depicted method or device, and such further applications of the principles of the invention as illustrated therein, as would normally occur to one skilled in the art to which the invention relates are considered to be within the spirit of the invention.

Figure 1:
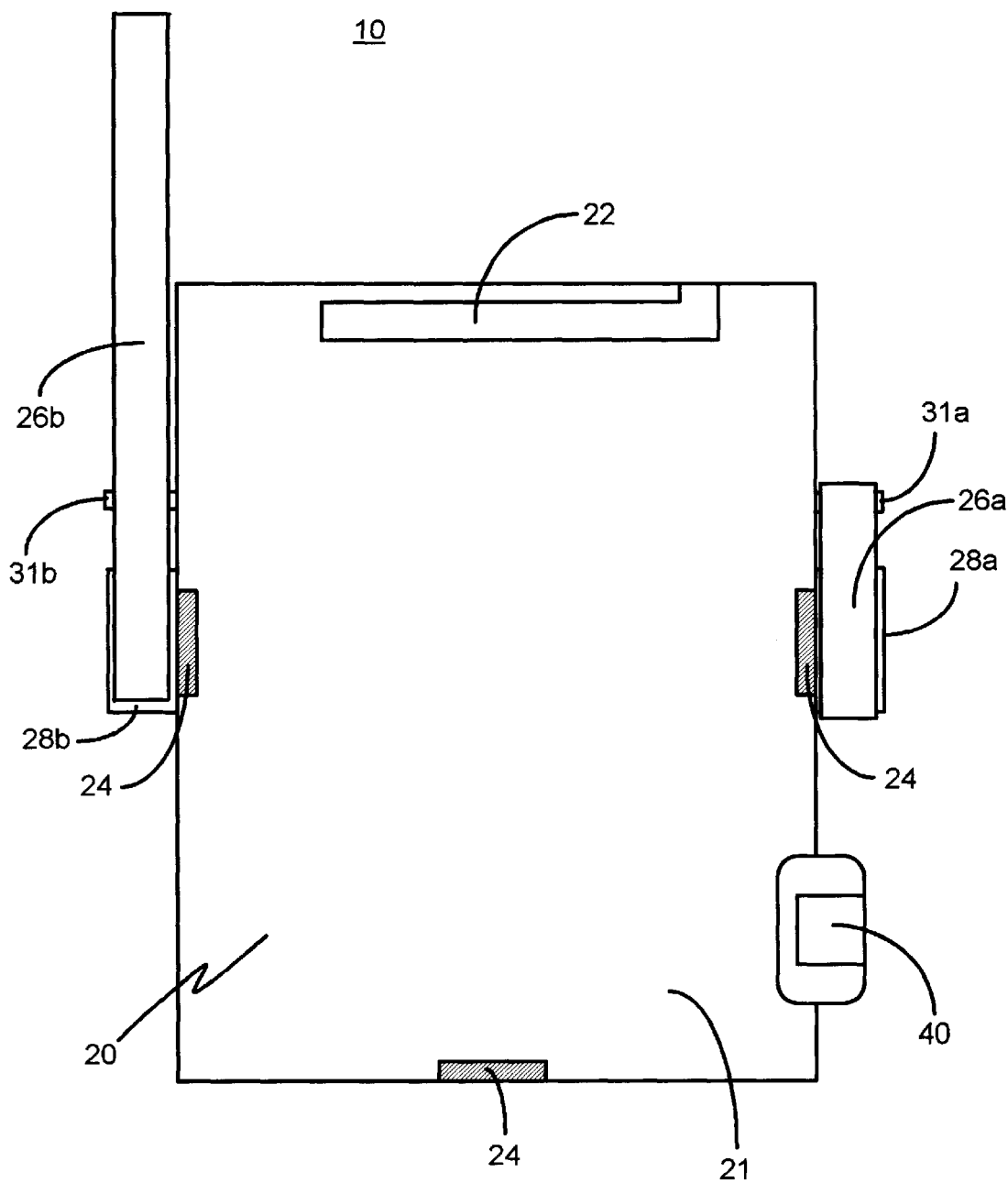
FIG. 1 is a top view of one embodiment of the present invention.

Referring now to FIG. 1, there is shown a top view of one embodiment of the present invention. Organizer 10 is made of any suitable material such as wood, metal, or preferably plastic. Organizer 10 consists of a base 20 with a base top face 21 having pad stops 24 on three sides to prevent paper from sliding off organizer 10. Also shown attached to base 20 are pad clip 22, pegs 31a and 31b, pen/pencil holder 40, and supports 28a and 28b. Pegs 31a and 31b may be located above supports 28a and 28b as shown, or may be located below supports 28a and 28b. Pegs 31a and 31b may also be omitted from organizer 10. Pen/pencil holder 40 may be attached to base 20 in any position in which it will not interfere with pad clip 22. Organizer 10 is preferably made by injection molding so that pad clip 22, supports 28a and 28b, pegs 31a and 31b, pen/pencil holder 40 and pad stops 24 are all integrally molded as part of base 20 instead of being individually attached to base 20.

Straps 26a and 26b are attached to supports 28a and 28b respectively, preferably by glue. Strap 26a is shown wrapped around support 28a and peg 31a in its storage position while strap 26b is shown fully extended. Straps 26a and 26b may be made of any material capable of removably attaching organizer 10 to a cart handle, such as leather belt-like straps, ribbons, strings, or preferably hook-and-loop material such as Velcro®. Straps 26a and 26b may also be made of an elastic-type material, such as rubber, that is capable of being stretched and wrapped around a cart handle to securely attach and hold organizer 10 in position. The elastic-type material could be attached to itself by having a hook on the end of the strap that would fit into holes in the strap, or it could have a hook on the end of the strap that would attach to another suitable location on organizer 10. Another option would be to have a hook-type protrusion on organizer 10 for accepting one of the holes in the straps.

The advantage of hook-and-loop material is that when organizer 10 is removed from cart handle 100, loose strap 26a can be wrapped around support 28a and peg 31a snugly. This reduces the space strap 26a occupies, keeping strap 26a out of the way when organizer 10 is attached to a refrigerator. Loose strap 26b can similarly be wrapped around support 28b and peg 31b for storage.

Figure 2:
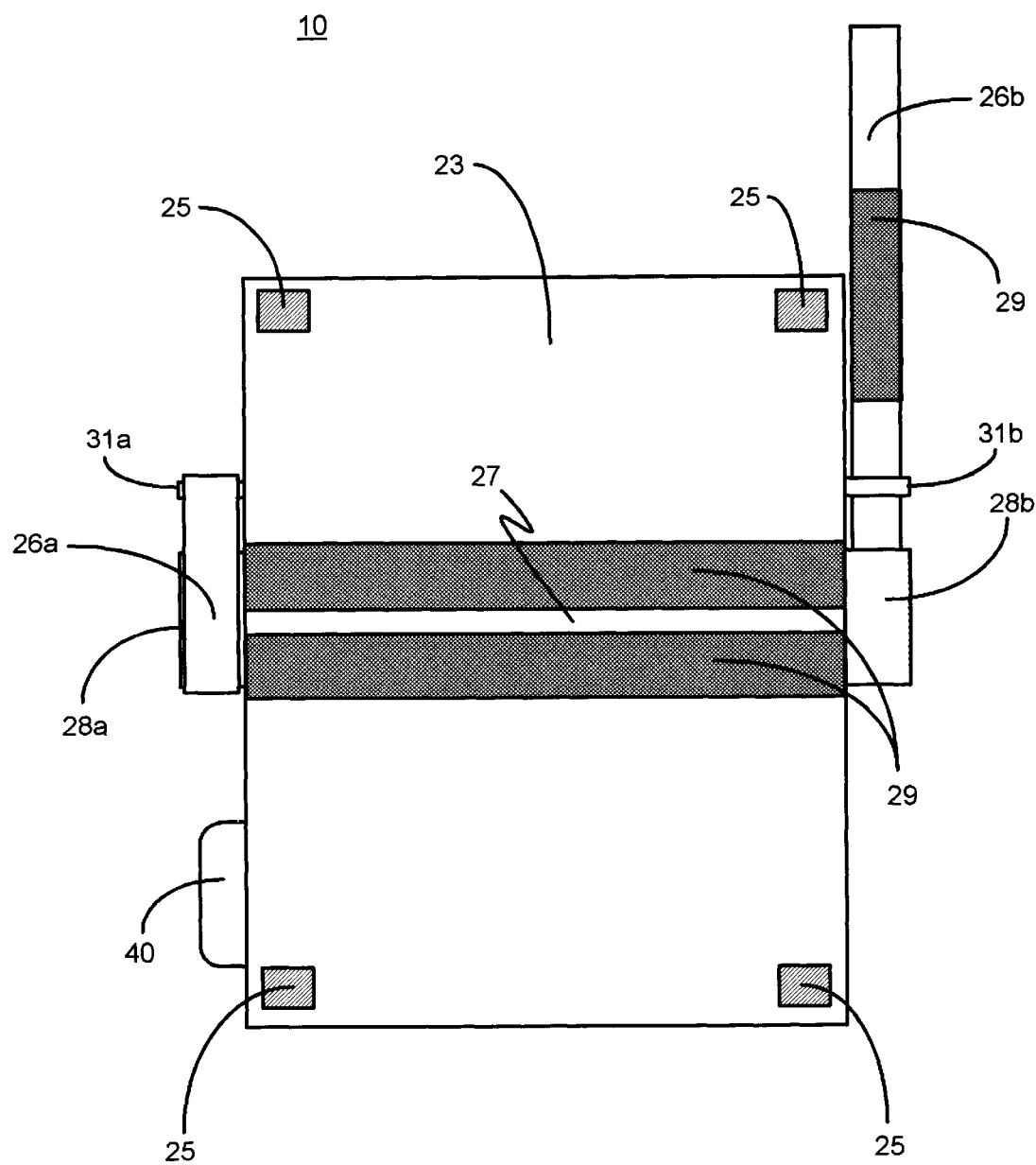
FIG. 2 is a bottom view of the present invention shown in FIG. 1.

Referring now to FIG. 2, there is shown a bottom view of organizer 10 shown in FIG. 1. Base bottom face 23 is shown having a magnet 25 attached in each corner for storing organizer 10 on a refrigerator or other metal object at home. Magnets 25 are preferably glued to base bottom face 23. In addition to or in place of magnets 25, organizer 10 may have a tab with a hole attached to a top edge of base 20 or elsewhere to allow organizer 10 to be hung on a hook or nail at home for storage. Also shown is saddle 27 running the entire width of organizer 10. Saddle 27 and straps 26a and 26b have grips 29 on them for preventing organizer 10 from moving once attached to a cart handle. Grips 29 are made of a high friction material which prevents organizer 10 from pivoting around a cart handle, preferably a textured rubber material. Grips 29 may be two pieces of high friction material as shown, or may also be one larger piece of high friction material. As in FIG. 1, strap 26a is shown wrapped around support 28a in its storage position, while strap 26b is shown fully extended.

Figure 3:
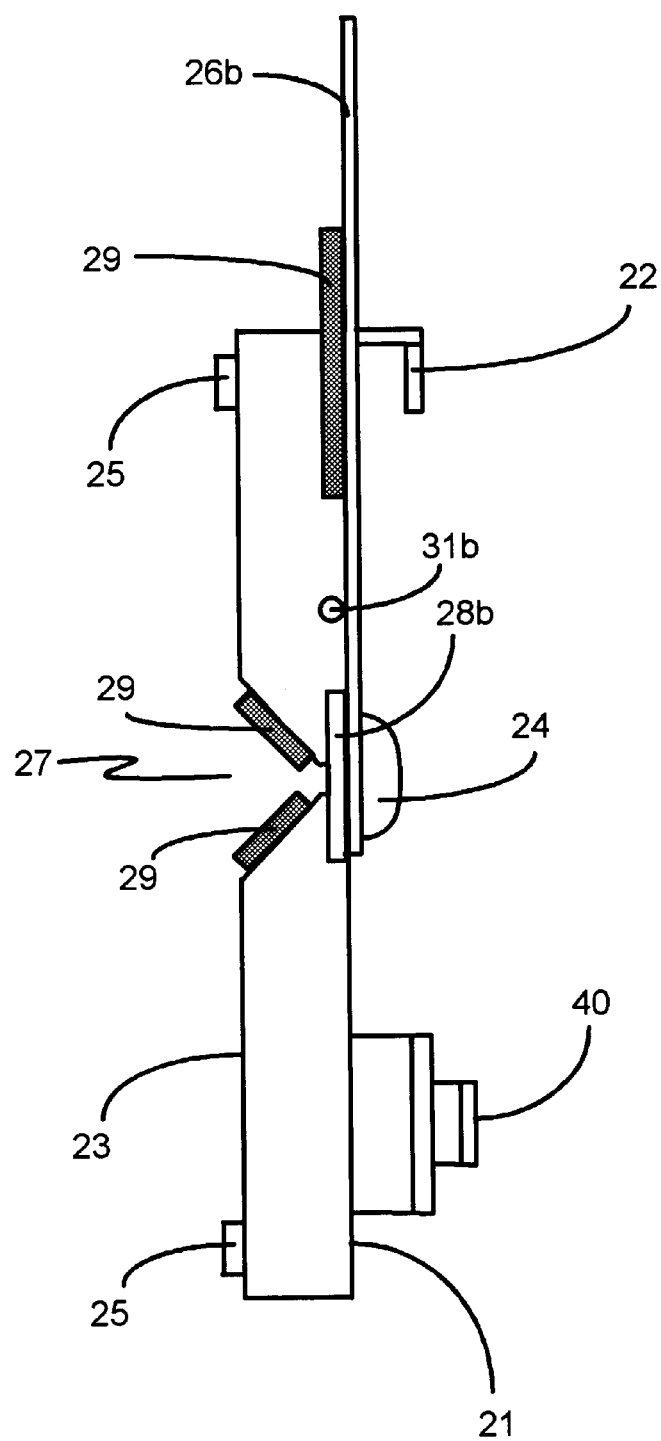
FIG. 3 is a side view of the present invention shown in FIG. 2.

Referring now to FIG. 3, there is shown a side view of the present invention shown in FIG. 2. In this embodiment of the present invention, saddle 27 is incorporated into base bottom face 23. Grips 29 are securely attached within saddle 27 and positioned for receiving a cart handle. Grips 29 may consist of two elongated strips of high friction material coextensive with saddle 27, or of a plurality of pieces of high friction material properly situated in saddle 27 to provide similar anti-slip characteristics.

Figure 4:
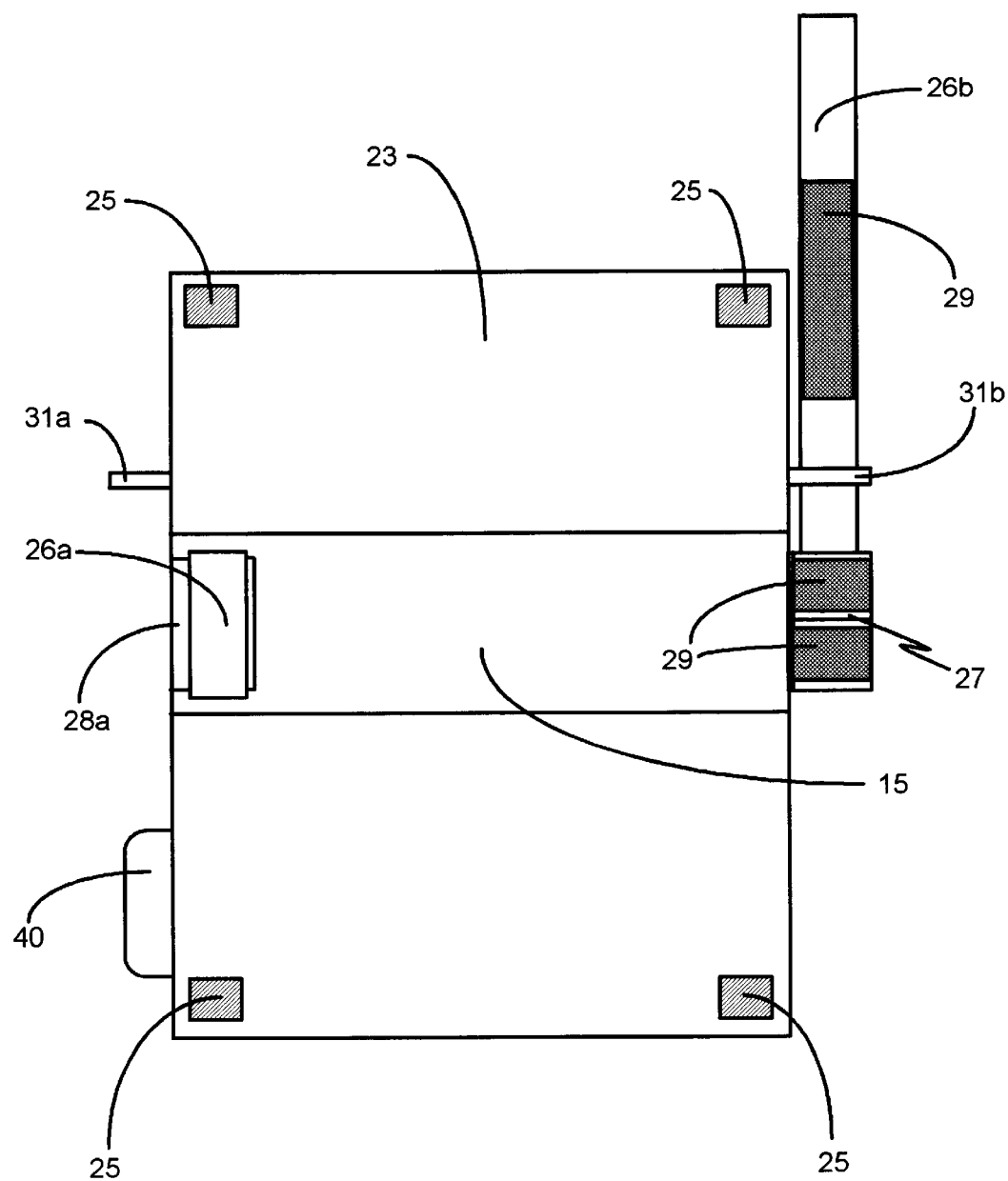
FIG. 4 is a bottom view of another embodiment of the present invention shown in FIG. 1, showing a different saddle design.

Referring now to FIG. 4, there is shown a bottom view of another embodiment of organizer 10. In this embodiment, instead of saddle 27 being incorporated into base bottom face 23, saddles 27 are incorporated on the bottom of supports 28a and 28b. Grips 29 are securably attached, preferably with glue, within saddles 27 and positioned for receiving a cart handle. Grips 29 may consist of two elongated strips of high friction material coextensive with saddles 27, or of a plurality of pieces of high friction material properly situated in saddles 27 to provide similar anti-slip characteristics. Grips 29 may also be made of an anti-slip material that may be sprayed, painted or the like onto saddles 27. Saddles 27 may also be coated with an anti-slip material by being dipped into such a material. Supports 28a and 28b may be either rigidly or retractably attached to base 20. Support 28a is shown as being preferably retractably attached to base 20 so it may be folded back into recessed area 15 of base bottom face 23 for storage.

Figure 5:
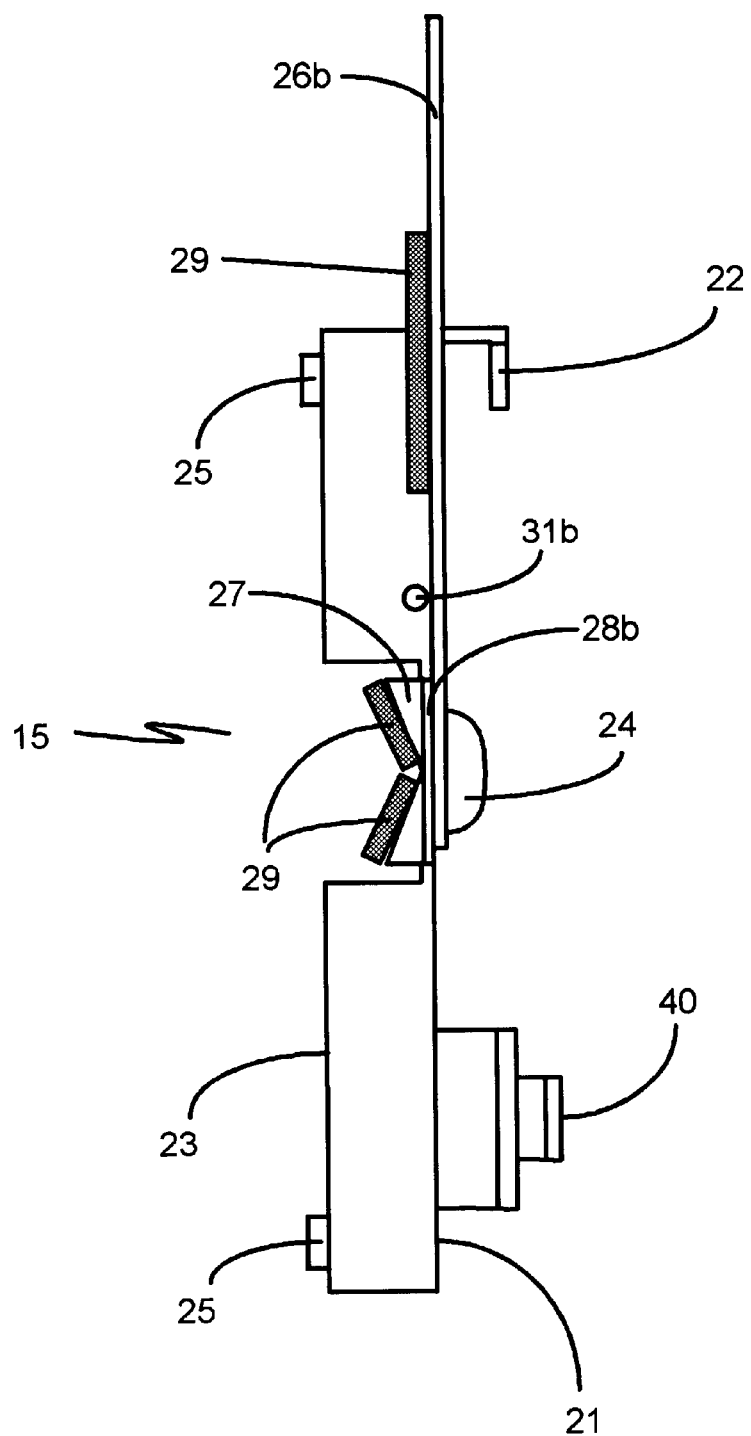
FIG. 5 is a side view of the present invention shown in FIG. 4.

Referring now to FIG. 5, there is shown a side view of organizer 10 shown in FIG. 4. Saddle 27 is shown attached to the bottom of support 28b. Another saddle 27 is similarly attached to the bottom of support 28a. Grips 29 may be made of a high friction material attached to saddles 27. Grips 29 may also be made of an anti-slip material that may be sprayed, painted or the like onto saddles 27. Saddles 27 may also be coated with an anti-slip material by being dipped into such a material. Base bottom face 23 is shown having a recessed area 15 where supports 28a and 28b may be folded back out of the way for storage.

Figure 6:
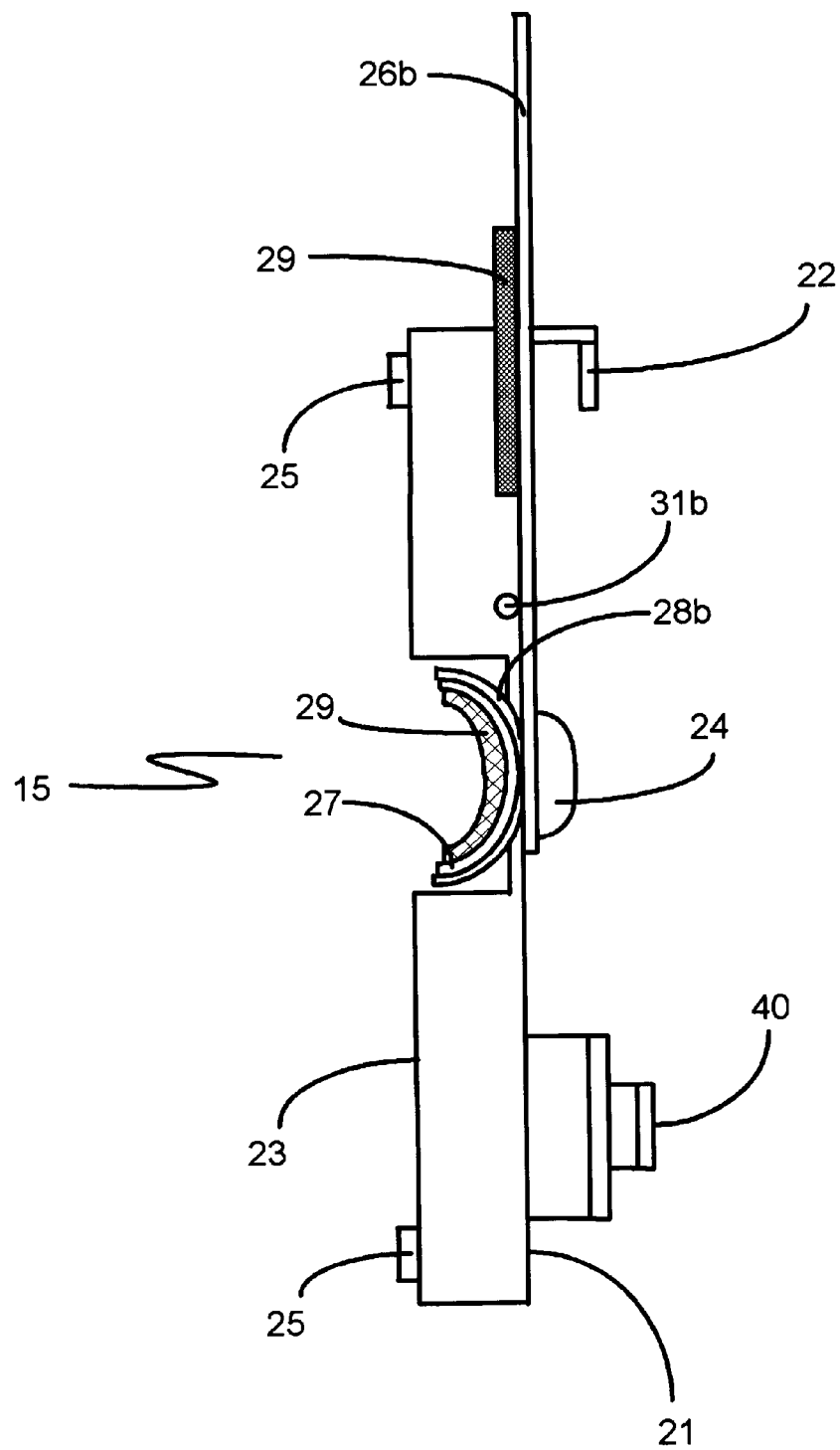
FIG. 6 is a side view of another embodiment of the present invention with a curved support and saddle.

Referring now to FIG. 6, there is shown a side view of organizer 10 with another embodiment of the support and saddle design. In this embodiment of the present invention, supports 28a and 28b and saddles 27 are curved to receive and attach to a rounded cart handle more securely. Saddles 27 are attached to supports 28a and 28b. Grips 29 are securably attached, preferably by glue, to saddles 27 in any manner so as to provide anti-slip characteristics. In this embodiment, saddles 27 could be left out and grips 29 could be attached directly to supports 28a and 28b.

Figure 7:
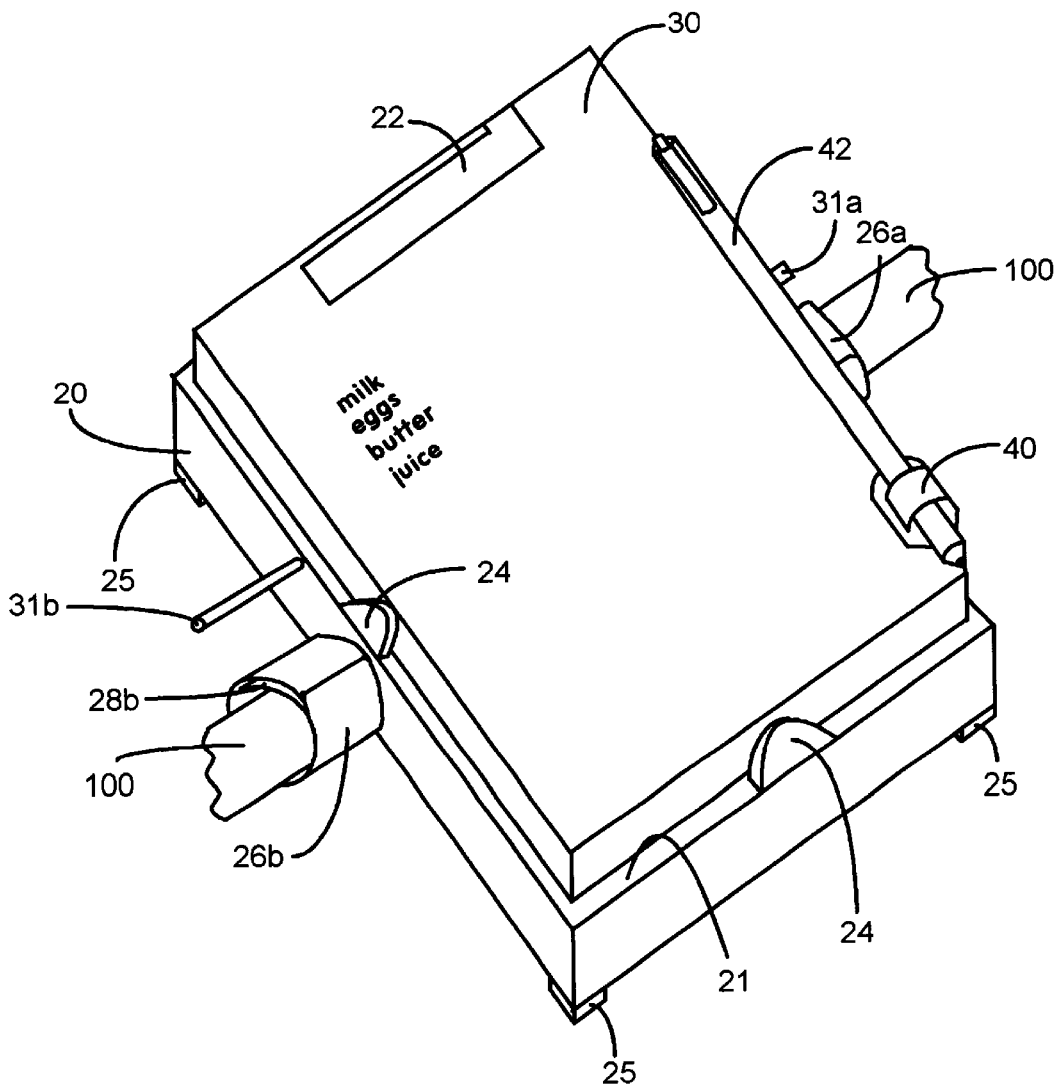
FIG. 7 is a top perspective view of the present invention shown in FIG. 1, as mounted on a cart handle.

Referring now to FIG. 7, there is shown a top perspective view of organizer 10 shown in FIG. 1, as seen when mounted on a cart handle 100. Again, pad stops 24, pad clip 22, pegs 31a and 31b, pen/pencil holder 40 and support 28b are shown. Pad 30 and pen/pencil 42 are also shown. Organizer 10 may be used on shopping carts, golf carts, infant strollers, boat rails, bicycle handlebars, motorcycle handlebars, snowmobile handlebars, and the like. Organizer 10 may also display or record information on hospital bed rails, or on any type of service carts. When straps 26a and 26b are wrapped around cart handle 100 and supports 28a and 28b respectively and are fastened, grips 29 grab onto cart handle 100, thereby securely and removably attaching organizer 10 to cart handle 100.

Figure 8:
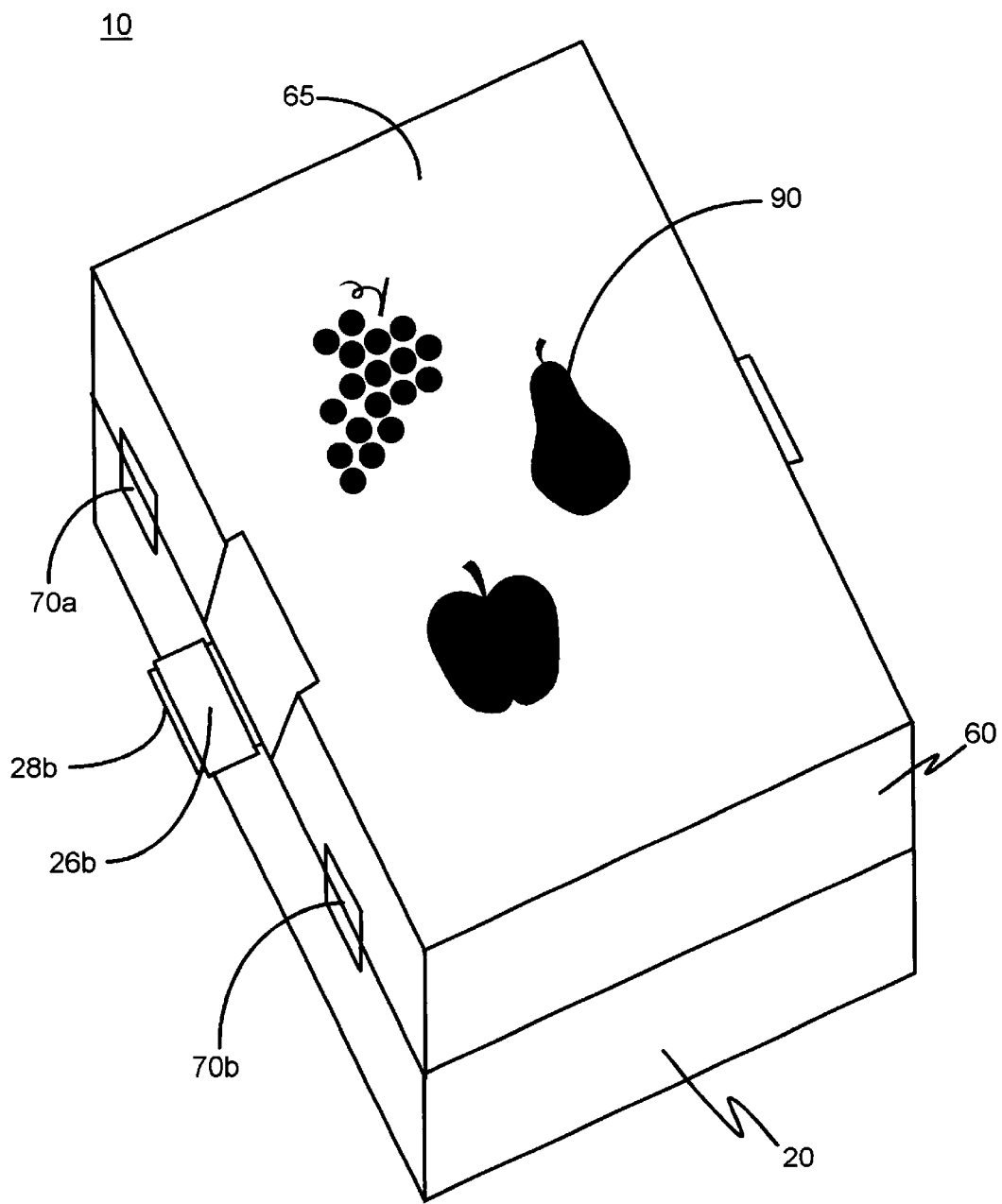
FIG. 8 is a top perspective view of a second embodiment of the present invention, as seen when the cover is closed.

Referring now to FIG. 8, there is shown a top perspective view of a second embodiment of organizer 10. In this embodiment of the present invention, organizer 10 has a base 20 and a cover 60. Cover 60 is hingedly attached to base 20 by at least one large hinge or at least two smaller hinges. In the preferred embodiment, cover 60 is hingedly attached to base 20 by top hinge 70a and bottom hinge 70b, where top hinge 70a and bottom hinge 70b are integrally formed into "living hinges" during the injection molding process. Hinges may also be any other type of hinge such as spring-loaded hinges. Support 28b is shown attached to base 20 so that when cover 60 is opened, support 28b does not interfere with cover 60. Design 90 is also shown attached to cover outside face 65. Design 90 may be either printed on, molded into or attached to cover outside face 65. Pegs 31 are not included in this embodiment of the present invention, but pegs 31 may be added to base 20 so long as adaptations are made so pegs 31 will not interfere with cover 60 when it is open.

Figure 9:
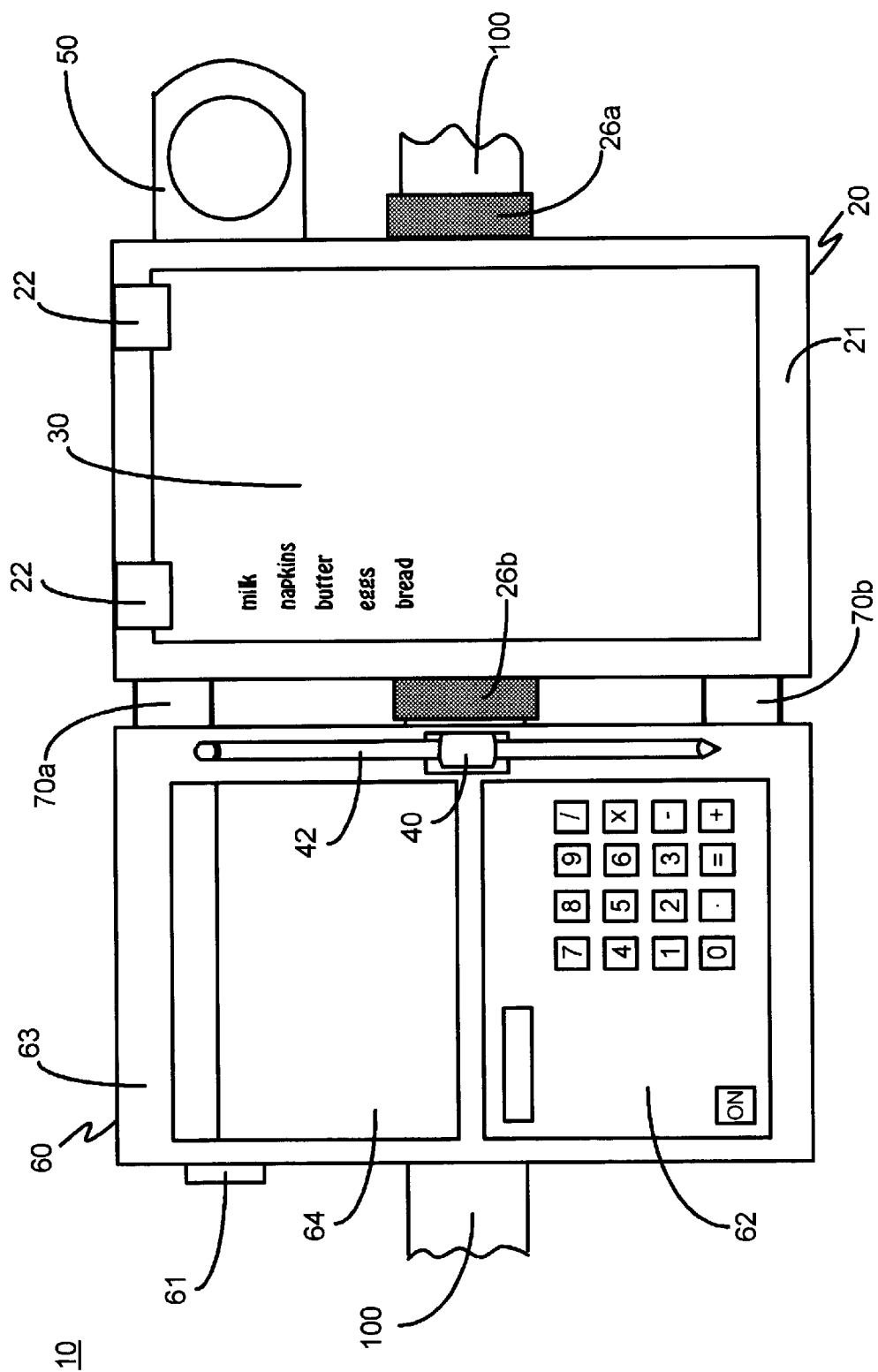
FIG. 9 is a view of the present invention shown in FIG. 8, as seen when open and mounted on a cart handle.

Referring now to FIG. 9, there is shown an open view of organizer 10 shown in FIG. 8 as seen when mounted on a cart handle 100. Base 20 has at least one pad clip 22 for holding pad 30 in place. Base 20 may also include a cupholder 50 preferably attached to the bottom face of base 20 such that cupholder 50 retractably slides, rotates or flips from an upper, right-hand side extension onto the bottom face for storage. This is more clearly shown in FIG. 10. Cover 60 may have a pen/pencil holder 40 attached to cover inside face 63 for holding a pen/pencil 42. Cover 60 may also have a calculator 62 and/or a pocket 64 attached to cover inside face 63. Cover 60 preferably includes a latch 61 for holding organizer 10 closed while organizer 10 is stored on a metal surface such as a refrigerator. Latch 61 may be positioned either on cover 60 or on base 20 with a mating portion positioned for operatively securing cover 60 and base 20 to one another when organizer 10 is in a closed position. Another way to retain organizer 10 in a closed position without using a separate latch mechanism such as latch 61, could be to incorporate at least one spring-loaded hinge in place of hinge 70a and/or 70b. The biasing action of the spring-loaded hinge would keep the organizer 10 closed when not in its full open position. When organizer 10 is in the full open position, the biasing action of the spring-loaded hinge would be insufficient to automatically close organizer 10.

Figure 10:
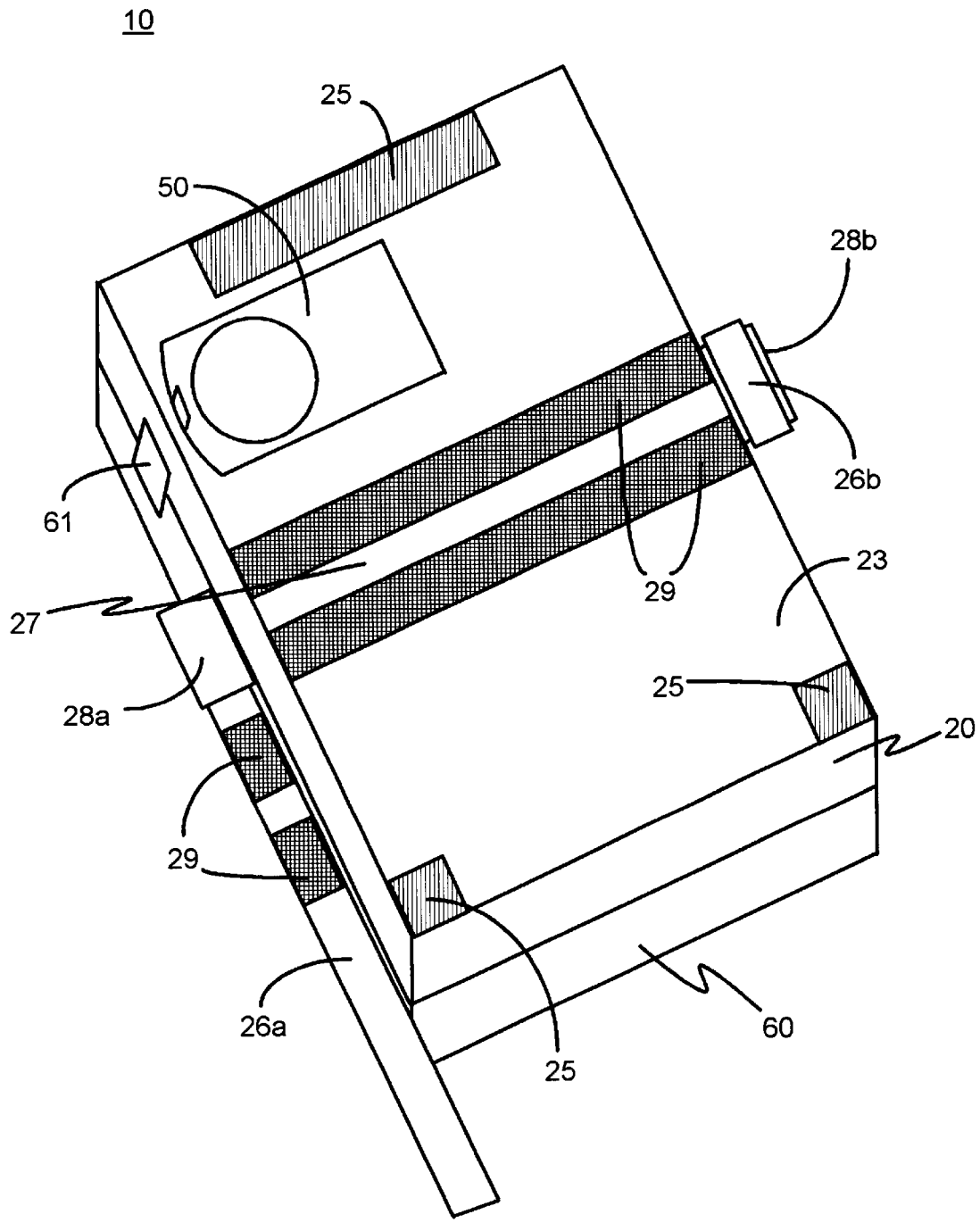
FIG. 10 is a bottom perspective view of the present invention shown in FIG. 8, as seen when closed and unattached from a cart handle.

Referring now to FIG. 10, there is shown a bottom perspective view of organizer 10. Cup holder 50 is shown retractably attached to base bottom face 23. In the preferred embodiment, cup holder 50 slides out from base bottom face 23 and locks into an extended position with a retention mechanism. Cup holder 50 then slides back into base bottom face 23 and is preferably held in a closed position by latch 61. Latch 61 is preferably a clip, but could also be a buckle or a spring-loaded hinge. Cup holder 50 may also be attached to base bottom face 23 such that cup holder 50 rotates or folds into its storage position. Cup holder 50 may be modified to hold a straight can as well as a tapered cup. Saddle 27 has high friction material grips 29 attached to it for gripping a cart handle. In this embodiment, saddle 27 is shown as being incorporated into base bottom face 23. However, as previously discussed, supports 28a and 28b may be formed to incorporate a saddle 27 in each support 28a and 28b. Each saddle 27 would then contain high friction grips 29 to prevent organizer 10 from sliding or rotating around a cart handle. Preferably and for better stability, one longer magnet 25 is located adjacent the top of organizer 10 while two other magnets 25 are located in the lower corners. Magnets 25 may also be attached in each corner to allow organizer 10 to be easily stored on a metal object at home. Also organizer 10 may have one longer magnet 25 located adjacent the top of organizer 10 with support pads or "feet" located in the lower corners. Any number and placement of magnets may be used without deviating from the spirit of this invention. Although not shown in FIG. 10, organizer 10 may be designed to have "wrapping" pegs as illustrated in FIG. 1.

What is claimed is:

1. A shopping organizer comprising:
    a base with a top face, a bottom face, a top edge, a bottom edge, a first side edge and a second side edge;
    at least one pad clip attached to said base proximate to said top edge and located to allow easy use and removal of a paper pad;
    a writing instrument holder attached to said base, wherein said writing instrument holder is located for noninterference and easy use of said at least one pad clip;
    at least one securing support attached to said first side edge or said second side edge of said base;
    at least one strap attached to said at least one securing support for removably attaching said shopping organizer to a shopping basket; and
    at least one saddle incorporated into said bottom face of said shopping organizer wherein said at least one securing support is in axial alignment with said saddle and wherein said saddle and said at least one securing support is parallel to the width of said shopping organizer and positioned within a middle region of the bottom face from said top edge and said bottom edge.

2. The shopping organizer of claim 1 further comprising at least one magnet attached to said bottom face.

3. The shopping organizer of claim 1 further comprising anti-slip material within said at least one saddle.

4. The shopping organizer of claim 1 further comprising at least one cupholder attached to said bottom face such that said at least one cupholder retractably slides, rotates or flips from an upper right-hand side extension onto said bottom face for storage.

5. The shopping organizer of claim 1 further comprising a cover having an inside face, an outside face and four sides, wherein one of said four sides is hingedly attached to said base.

6. The shopping organizer of claim 5 further comprising a calculator removably disposed on said inside face.

7. The shopping organizer of claim 5 further comprising at least one pocket attached to said inside face.

8. The shopping organizer of claim 5 further comprising at least one latch mechanism.

9. A shopping organizer for attaching to a shopping basket, said shopping organizer comprising:
    a base with a top face, a bottom face, a top edge, a bottom edge, a first side edge and a second side edge;
    at least one pad clip attached to said base proximate to said top edge;
    at least one securing support attached to said base at said first or second side edge, said securing support having a saddle incorporated therein; and
    at least one strap attached to said at least one securing support for removably attaching said shopping organizer to said shopping basket.

10. The shopping organizer of claim 9 further comprising anti-slip material within said at least one saddle.

11. The shopping organizer of claim 9 further comprising a cover having an inside face, an outside face, and four sides, wherein one of said four sides is hingedly attached to said base.

12. The shopping organizer of claim 11 further comprising a calculator removably disposed on said inside face.

13. The shopping organizer of claim 11 further comprising at least one pocket attached to said inside face.

14. The shopping organizer of claim 11 further comprising at least one latch mechanism.

15. The shopping organizer of claim 11 further comprising at least one writing instrument holder.

16. The shopping organizer of claim 9 further comprising at least one cupholder attached to said bottom face such that said at least one cupholder retractably slides, rotates or flips from an upper right-hand side extension onto said bottom face for storage.

17. The shopping organizer of claim 11 further comprising at least one magnet attached to said bottom face.

18. A method of using a shopping organizer with a shopping basket, said method comprising:

a. placing said shopping organizer on a shopping basket handle, said shopping organizer having at least one saddle in a middle portion of a bottom surface of a base of said shopping organizer or in a securing structure attached to said base of said shopping organizer and spaced from a top edge and a bottom edge of said shopping organizer for receiving said shopping basket handle, said at least one securing structure having a strap for securing said shopping organizer to said shopping basket handle; and b. wrapping said strap around said shopping basket handle and said securing structure and thereby securing said shopping organizer to said shopping basket handle.

\* \* \* \* \*